Patented Jan. 26, 1926.

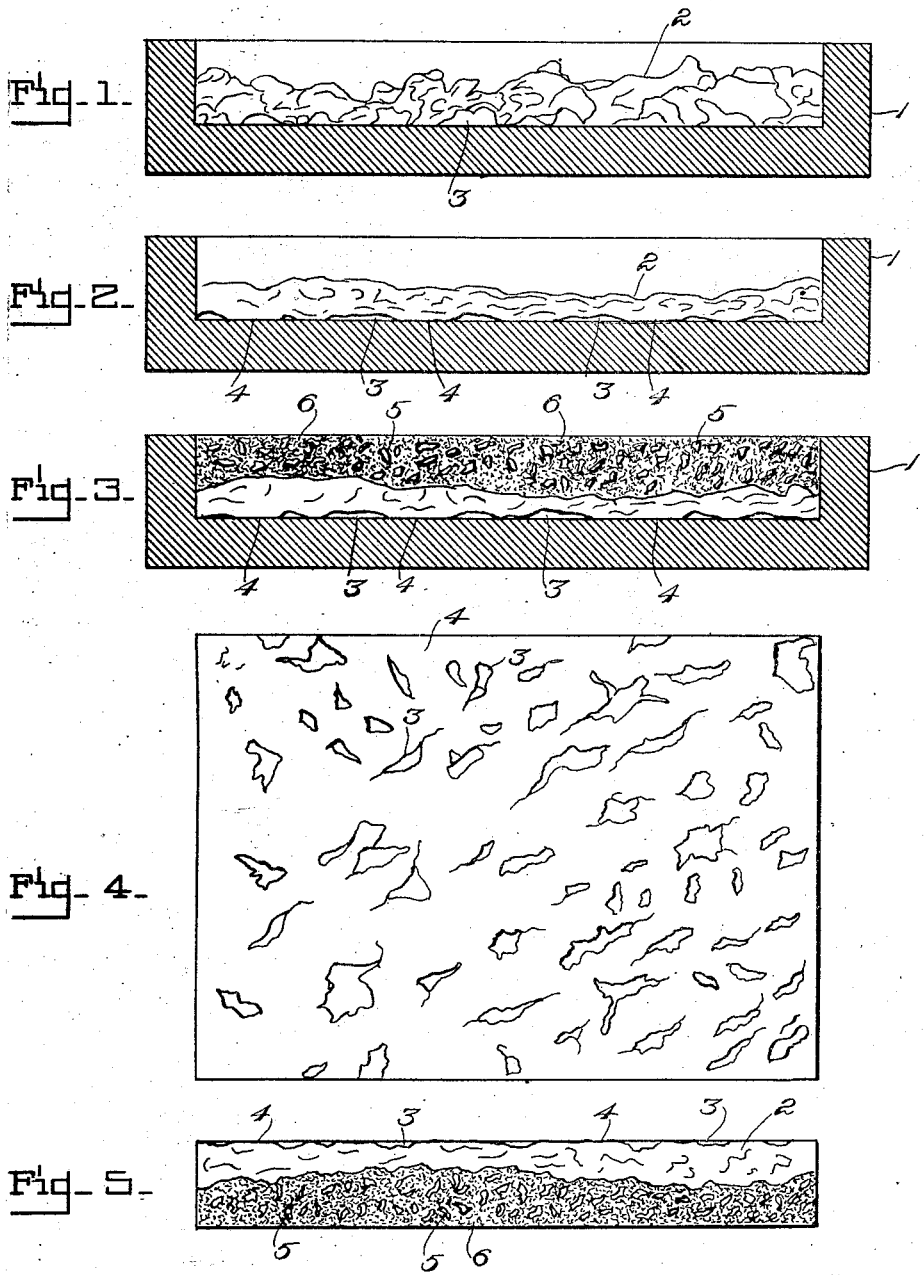

1,570,817

UNITED STATES PATENT OFFICE.

SALVATORE S. ZOTTOLI, OF QUINCY, MASSACHUSETTS.

ARTIFICIAL STONE AND METHOD OF MAKING SAME.

Application filed February 26, 1924. Serial No. 695,348.

*To all whom it may concern:*

Be it known that I, SALVATORE S. ZOTTOLI, a citizen of the United States, residing at Quincy, county of Norfolk, State of Massachusetts, have invented a certain new and useful Improvement in Artificial Stone and Methods of Making Same, of which the following is a specification, reference being had therein to the accompanying drawings.

The object of the invention is to produce an imitation stone material which shall have the appearance of marble or other natural stone according to the particular kind desired to be imitated and which can be molded to the desired shape and which shall have many advantages over the natural stone such as being tougher and less brittle and permitting nails to be driven into or through it and which is cheaper than the natural stone. The invention is intended for use particularly in the manufacture of travertin which is a porous marble and is in favor for certain purposes on account of its porous character and the pocks in its surface even when dressed. The invention is not limited, however, to use in making imitation travertin but by slight variation in the mixture and in the manipulation and dressing of the surface, other stones may be imitated as desired.

The invention will be fully understood from the following description when taken in connection with the accompanying drawings, and the novel features thereof will be pointed out and clearly defined in the claims at the close of this specification.

In the drawings:

Fig. 1 is a sectional view of a form having therein the mixture for the facing portion of a block or slab of artificial stone embodying the invention before the mixture is submitted to any treatment.

Fig. 2 is a view similar to Fig. 1 showing the mixture after it has been submitted to surface pressure.

Fig. 3 is a view similar to Fig. 2 after the facing mixture has been pressed and the backing mixture has been put into the form on top of the facing mixture.

Fig. 4 is a plan view of the face of the finished product in imitation of travertin, after it is taken from the mold and turned face up.

Fig. 5 is a sectional view of the finished product shown in Fig. 4.

Figure 6:
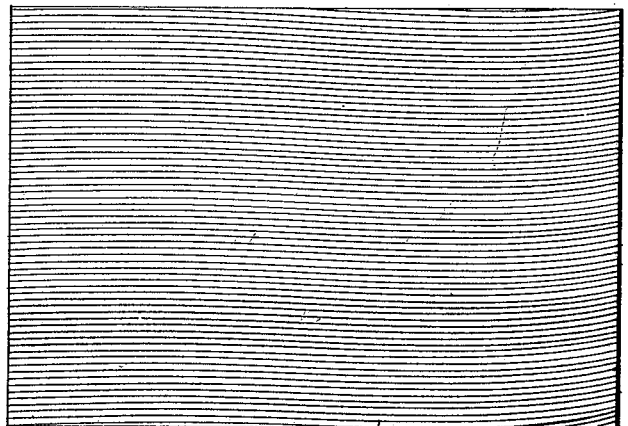
Fig. 6 is a plan view of the face side of a slab of artificial stone embodying the invention having a smooth face.

Referring now to the drawings: There is shown at 1 a mold or form which may be rectangular or of any other form, shape or size according to the contour of the block, slab or other article which is to be molded. The facing mixture is composed of any sutiable cement mixed with water to a consistency which shall leave it moist enough to be molded. For example, any one of a number of cements, such as Keene, Portland, Atlas or Medusa, white cements may be used as a base to which may be added coloring matter of any color desired, if colored stone is to be imitated. The moistened mass is then put into the mold or form, as shown at 2, and spread over the bottom of the form in lumps to a depth varying according to the thickness desired for the facing portion of the finished product. The loose mass will preferably be about twice the depth of the facing after it is finished. About ¼ of an inch is sufficient for the usual thickness of finished facing desired but it will vary according to preference. The bottom of the mold or pattern should be smooth. To carry out my invention, the mixture while still wet, should be pressed down firmly against the bottom of the mold. This pressure may well be done by the operative by the use of his thumbs and fingers.

After the product becomes dry the under face will have the appearance similar to that shown in Figs. 4 and 5, in which the product is shown removed from the mold and face side up, the smooth places 4 showing where it was pressed down.

It is preferable to have combined with the facing a backing of considerable more body thickness than the face portion. The backing mixture employed is as follows: It consists of a mixture of small pieces 5 of wood or woody material combined with cement or plaster 6 sufficient to make a plastic mass. Wood shavings, for instance, are the preferred form of the woody matter, an important feature being that the woody substance shall be in sufficiently small or fine pieces to be readily mixed with the cement. Small chips or ground cork or sawdust or wood sawed or cut or broken into small portions in any way may be employed.

The woody matter is thoroughly mixed with the cement so as to make a plastic mass and it is then put into the mold or form on top of the facing mixture 2 while the facing mixture is still wet. This backing mixture may be of any thickness desired. Preferably it is of greater thickness than the thickness of the facing mixture, the thickness depending upon the thickness of the product desired. This backing mixture is then pressed down firmly upon the facing mixture so that it will become firmly bonded with the facing mixture and should be levelled off on top. The whole mass is then allowed to dry and it will be found that the facing mixture and the backing mixtures will be thoroughly bonded together as an integral, hard mass and may then be removed from the mold.

After the dried product has been removed from the form, the face may be still further finished according to desire. Preferably the surface is scoured to smooth down any roughnesses. If a polished surface is desired the face may be polished in any well known way. This still leaves the pockets in the facing while the level part between the pockets is smooth and polished like the polished natural travertin.

Figure 7:
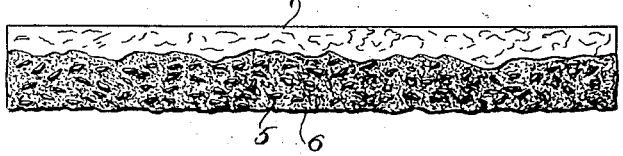
Fig. 7 is a sectional view of the product shown in Fig. 6.

If instead of the travertin style of finish an entirely smooth surface is desired, as shown in Figs. 6 and 7, in which the face side 7 is smooth all over, the upper surface of the facing material, while in the mold, will be pressed all over on the top of the plastic mass which forms the facing.

The backing material composed of cement and woody matter is then packed in on top of the facing material in the same manner as previously described in the production of the imitation travertin and then the combined mass will be dried and removed from the mold. The face will then appear as in Fig. 7. It may be left in this comparatively smooth, unpolished form or it may be polished according to desire as before. By putting coloring matter into the facing mixture a product may be produced in imitation of any colored natural stone.

The material thus made may be nailed to studs or boards. Where the imitation travertin is used the nails should preferably be driven in through the pockets, or, if they are driven through the smooth parts, a pointed tool should preferably be used to start the entering hole for the nails. The backing is sufficiently porous and tough to permit the nails to be readily driven through without breaking or splintering.

The facing is water proof and the whole product is fire resisting and much lighter in weight than natural stone. It can be used both for outside walls and for inside finish for dadoes, ceilings, or any place where natural travertin or stone would be used. It can be cast into column or pilaster capitals and bases, consoles, moldings, panels, festoon, wreaths or any other form of construction desired. For flat work it is very much cheaper than travertin and for any other form where the natural stone has to be carved, there is a still greater saving.

What I claim is:

1. The method of making imitation travertin consisting of placing in a mold a bed of cement mixed to a thick plastic consistency and pressing on the top surface while the cement is still in a plastic condition in such manner that portions of the under surface of the cement are pressed against the underlying surface of the mold with greater degree of pressure than other portions, whereby there are formed irregular cavities in the under surface of the molded cement and then allowing it to dry.

2. A molded imitation travertin consisting of a facing layer composed of cement having pockets in its face side in imitation of the pockets in genuine travertin and a backing layer composed of a mixture of cement and pieces of woody material.

3. A molded imitation travertin composed of a molded cement mixture dried hard and having in its face side cavities in imitation of cavities in genuine travertin.

In testimony whereof I affix my signature.

SALVATORE S. ZOTTOLI.